(12) United States Patent
Bales et al.

(10) Patent No.: US 10,935,037 B2
(45) Date of Patent: Mar. 2, 2021

(54) TOOL FOR SIMULTANEOUS LOCAL STRESS RELIEF OF EACH OF A MULTIPLE OF LINEAR FRICTION WELDS OF A ROTOR FORGING

(71) Applicant: United Technologies Corporation, Farmington, CT (US)

(72) Inventors: Daniel A. Bales, Avon, CT (US); Andrew L. Haynes, Glastonbury, CT (US); Luke H. Rettberg, West Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 482 days.

(21) Appl. No.: 15/863,167

(22) Filed: Jan. 5, 2018

(65) Prior Publication Data
US 2019/0211832 A1    Jul. 11, 2019

(51) Int. Cl.
*F04D 29/02* (2006.01)
*B23K 20/12* (2006.01)
(Continued)

(52) U.S. Cl.
CPC ............ *F04D 29/023* (2013.01); *B23K 20/12* (2013.01); *C21D 9/0006* (2013.01); *C21D 9/0068* (2013.01); *C21D 9/50* (2013.01); *C22F 1/10* (2013.01); *C22F 1/183* (2013.01); *F04D 29/329* (2013.01); *F02C 3/04* (2013.01); *F02K 3/06* (2013.01); *F05D 2220/32* (2013.01); *F05D 2230/239* (2013.01); *F05D 2230/40* (2013.01); *F05D 2300/174* (2013.01); *F05D 2300/177* (2013.01)

(58) Field of Classification Search
CPC .... B23K 20/12; C21D 9/0006; C21D 9/0068; C21D 9/50; C22F 1/10; C22F 1/183; F04D 29/023; F04D 29/329; F05D 2220/32; F05D 2230/239; F05D 2230/40; F05D 2300/174; F05D 2300/177
USPC ....... 266/249; 29/889.7; 72/343, 352, 353.2; 392/424; 219/544, 205, 201, 535, 601, 219/606
See application file for complete search history.

(56) References Cited

U.S. PATENT DOCUMENTS

| | | |
|---|---|---|
| 4,873,751 A | 10/1989 | Walker et al. |
| 6,438,838 B1 | 8/2002 | Meier et al. |

(Continued)

FOREIGN PATENT DOCUMENTS

| | | |
|---|---|---|
| EP | 2620516 A2 | 7/2013 |
| EP | 3143171 A2 | 3/2017 |
| RU | 2551045 C1 | 5/2015 |

OTHER PUBLICATIONS

U.S. Non-Final Office action dated Jun. 27, 2019 issued for corresponding U.S. Appl. No. 15/863,163.
(Continued)

*Primary Examiner* — Scott R Kastler
*Assistant Examiner* — Michael Aboagye
(74) *Attorney, Agent, or Firm* — Bachman & LaPointe, P.C.

(57) ABSTRACT

A tool for simultaneous local stress relief of each of a multiple of linear friction welds includes a columnar track defined along an axis, the columnar track having a helical slot; and a support structure engaged with the helical slot to translate and rotate a heat treat fixture portion along the axis.

13 Claims, 12 Drawing Sheets

(51) Int. Cl.
  *C22F 1/18* (2006.01)
  *C22F 1/10* (2006.01)
  *F04D 29/32* (2006.01)
  *C21D 9/00* (2006.01)
  *C21D 9/50* (2006.01)
  *F02C 3/04* (2006.01)
  *F02K 3/06* (2006.01)

(56) References Cited

U.S. PATENT DOCUMENTS

| | | | |
|---|---|---|---|
| 6,524,409 | B2 | 2/2003 | Barone et al. |
| 6,536,110 | B2 | 3/2003 | Smith et al. |
| 6,551,372 | B1 | 4/2003 | Ewing et al. |
| 7,358,466 | B1 | 4/2008 | Myers et al. |
| 7,449,075 | B2 | 11/2008 | Woodfield et al. |
| 8,202,473 | B2 * | 6/2012 | Pellerito ............... B23D 79/005 148/200 |
| 8,375,582 | B2 | 2/2013 | Bayer et al. |
| 8,437,628 | B1 | 5/2013 | Lin et al. |
| 9,869,182 | B2 * | 1/2018 | Albuzat ............... B23K 1/0018 |
| 10,633,731 | B2 * | 4/2020 | Bales ................. B23K 20/1205 |
| 2003/0000602 | A1 | 1/2003 | Smith et al. |
| 2006/0078455 | A1 | 4/2006 | Troitski et al. |
| 2009/0185908 | A1 | 7/2009 | Chung et al. |
| 2011/0076147 | A1 | 3/2011 | Ganesh et al. |
| 2012/0279066 | A1 | 11/2012 | Chin et al. |
| 2014/0093384 | A1 | 4/2014 | Mironets et al. |
| 2014/0117007 | A1 * | 5/2014 | Trapp ...................... C21D 1/42 219/601 |
| 2014/0140859 | A1 | 5/2014 | Bales et al. |
| 2015/0104318 | A1 * | 4/2015 | Koch ...................... B23K 1/20 416/213 R |
| 2016/0074957 | A1 * | 3/2016 | Nishida ................ B23K 20/126 228/114.5 |
| 2016/0153286 | A1 | 6/2016 | Suciu et al. |
| 2016/0160869 | A1 | 6/2016 | Roach et al. |
| 2017/0022827 | A1 | 1/2017 | Waldman et al. |
| 2017/0268091 | A1 | 9/2017 | Woodfield et al. |
| 2018/0371594 | A1 | 12/2018 | Raghavan et al. |

OTHER PUBLICATIONS

European Search Report dated May 22, 2019 issued for European Patent Application No. 19150589.0.
European Search Report dated Apr. 8, 2019 issued for European Patent Application No. 19150607.0.

* cited by examiner

TOOL FOR SIMULTANEOUS LOCAL STRESS RELIEF OF EACH OF A MULTIPLE OF LINEAR FRICTION WELDS OF A ROTOR FORGING

BACKGROUND

The present disclosure generally relates to titanium forgings, and more particularly, to a method and apparatus to increase the fatigue and tensile properties of fabricated integrally bladed rotors.

Cost effective manufacturing of a fabricated integrally bladed rotor (IBR) typically involves joining a plurality of airfoils to a titanium forged hub. A conventional manufacturing process for an IBR includes machining a titanium forging (typically Ti-6-4 alloy) to a pre-heat treat shape, solution heat treating, then liquid quenching to obtain a rapid cooling rate from the solution heat treat temperature, then subsequently annealing. Following annealing, the forging is machined to a rectilinear sonic inspection shape, then sonic inspected prior to additional machining. Another conventional process incorporates a machining step of the pre-heat treat shape to produce airfoil stubs such that increased cooling rates may be achieved further inboard toward a final inner diameter flow path.

SUMMARY

A tool for simultaneous local stress relief of each of a multiple of linear friction welds, the tool according to one disclosed non-limiting embodiment of the present disclosure includes a columnar track defined along an axis, the columnar track having a helical slot; and a support structure engaged with the helical slot to translate and rotate a heat treat fixture portion along the axis.

A further aspect of the present disclosure includes that the support structure comprises a collar assembly engaged with the columnar track.

A further aspect of the present disclosure includes that the collar assembly comprises a connecting arm and a carrier, the connecting arm mounted to the carrier through the helical slot.

A further aspect of the present disclosure includes that the connecting arm supports a crowned roller that engages the helical slot.

A further aspect of the present disclosure includes that the carrier rides along an outer surface of the columnar track.

A further aspect of the present disclosure includes that the carrier supports a bearing that rides along the outer surface of the columnar track.

A further aspect of the present disclosure includes an internal thread that receives a lead screw to provide the motive power for the support structure.

A tool for simultaneous local stress relief of each of a multiple of linear friction welds, the tool according to one disclosed non-limiting embodiment of the present disclosure includes a columnar track defined along an axis, the columnar track having a helical slot; an upper support structure engaged with the helical slot to translate and rotate an upper heat treat fixture portion along the axis; and a lower support structure engaged with the helical slot to translate and rotate a lower heat treat fixture portion along the axis, the lower support structure translates and rotates opposite the upper support structure.

A further aspect of the present disclosure includes that each of the multiple of linear friction welds are on a stub-containing rotor hub forging.

A further aspect of the present disclosure includes that each of the multiple of linear friction welds are between a stub and an airfoil.

A further aspect of the present disclosure includes that each stub and airfoil are pitched at a fixed angle.

A further aspect of the present disclosure includes that the upper heat treat fixture portion and the lower heat treat fixture portion each contain a multiple of heaters that produce a desired radiant heat around each of a multiple of airfoil shaped openings that define a predetermined area adjacent to each of the multiple of linear friction welds.

A further aspect of the present disclosure includes that the multiple of heaters are controlled by a control system in response to a temperature measurement by at least one thermocouple associated with each of the multiple of linear friction welds.

A further aspect of the present disclosure includes that the desired radiant heat around each of the multiple of airfoil shaped openings is individually controlled.

A further aspect of the present disclosure includes that the upper heat treat fixture portion and the lower heat treat fixture portion are manufactured of ceramic to support a multiple of heaters and a multiple of thermocouples.

A method for producing a rotor hub, the method according to one disclosed non-limiting embodiment of the present disclosure includes enclosing a predetermined area around a linear friction weld of an airfoil on each of a multiple of stubs of a stub-containing rotor hub forging with an upper heat treat fixture portion and a lower heat treat fixture portion; and concurrently stress relieving the linear friction welds with the upper heat treat fixture portion and the lower heat treat fixture portion within the predefined area while ensuring that a hub inner diameter does not exceed a predetermined temperature.

A further aspect of the present disclosure includes enclosing the predetermined area comprises rotating and translating the upper heat treat fixture portion and the lower heat treat fixture portion.

A further aspect of the present disclosure includes concurrently stress relieving comprises individually controlling a desired radiant heat around each linear friction weld.

A further aspect of the present disclosure includes concurrently stress relieving comprises maintaining the predefined area at a predetermined temperature for a predetermined time period.

A further aspect of the present disclosure includes individually controlling a desired radiant heat around each of the multiple of airfoil shaped openings.

The foregoing features and elements may be combined in various combinations without exclusivity, unless expressly indicated otherwise. These features and elements as well as the operation of the invention will become more apparent in light of the following description and the accompanying drawings. It should be appreciated, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
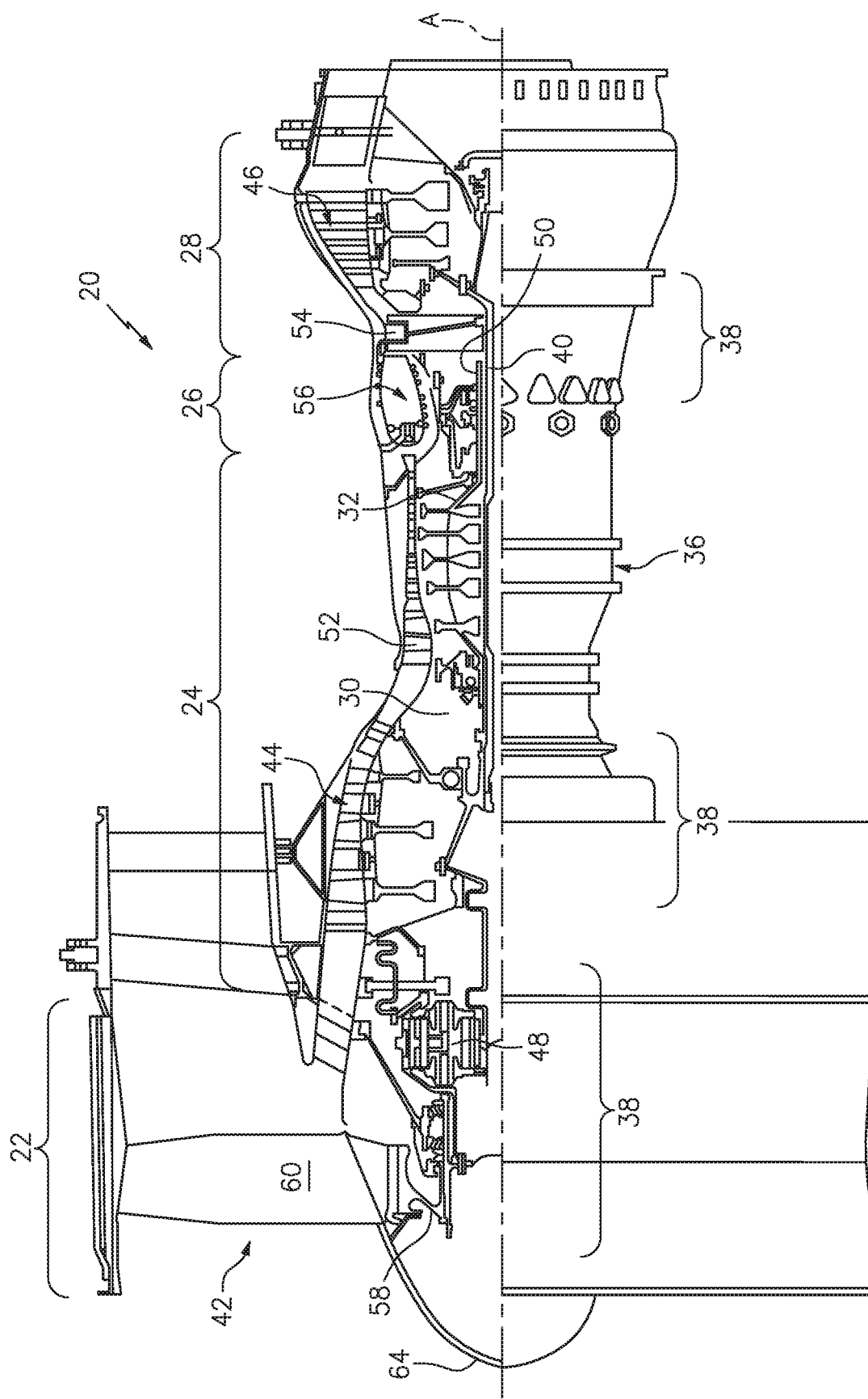
FIG. 1 is a partial cross-sectional illustration of a gas turbine engine.

FIG. 1 schematically illustrates a gas turbine engine 20. The gas turbine engine 20 as disclosed herein is a two-spool turbofan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

The fan 42 includes a rotor hub 58 with a plurality of circumferentially spaced fan blades 60. A nose cone 64 may be fastened to an upstream end of the rotor hub 58. The rotor may be provided in the form of an integrally bladed rotor (IBR; also, known as a blisk) which may be manufactured of a high-strength, low weight material such as a titanium alloy (typically Ti-6-4 alloy), high strength nickel base alloy, or other material. Although an example fan is illustrated and described in the disclosed embodiments, other components may also benefit herefrom.

Figure 2:
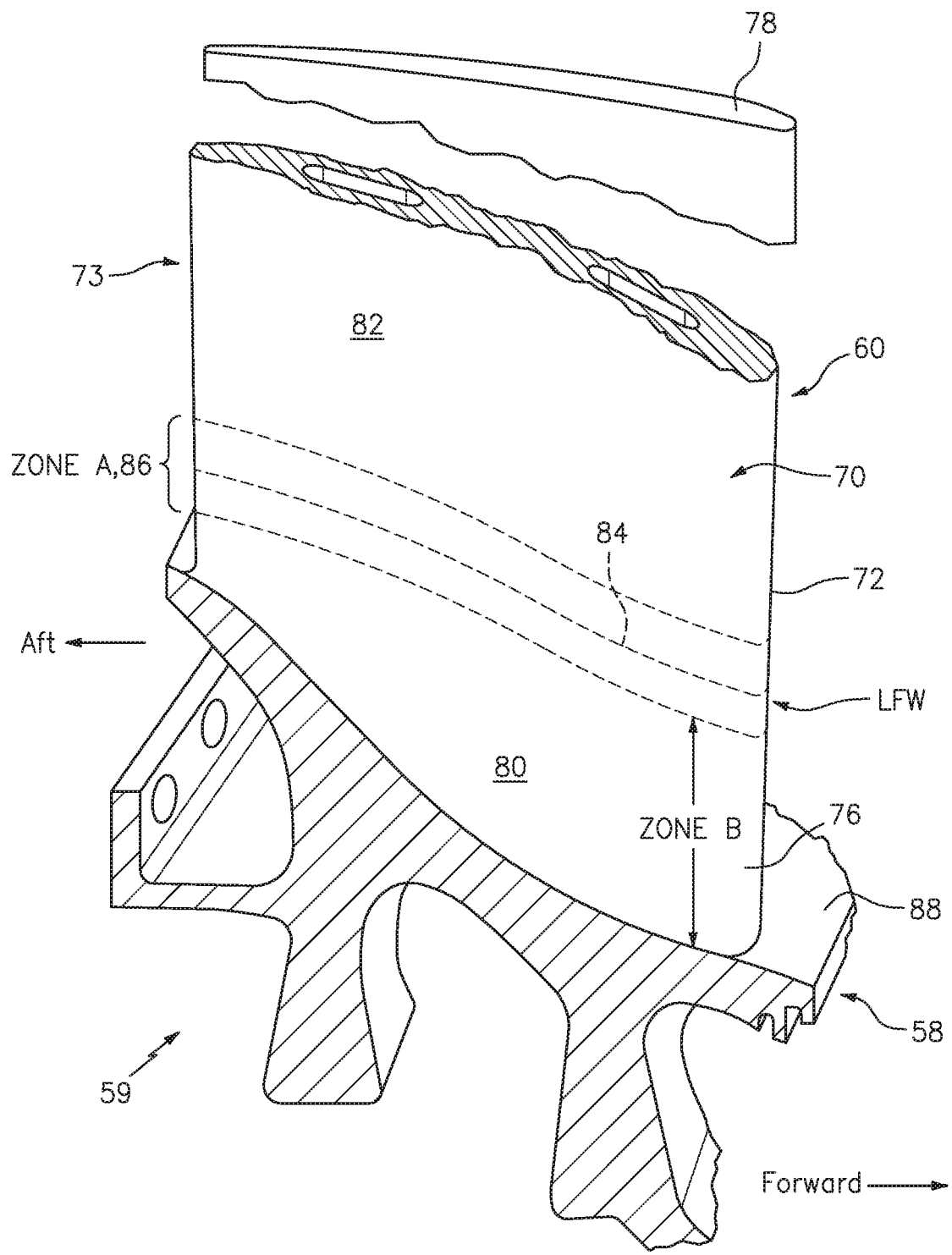
FIG. 2 is a partial cross-sectional illustration of a rotor hub of the gas turbine engine.

With reference to FIG. 2, the plurality of fan blades 60 are integrally formed with, and substantially radially extending from, the rotor hub 58. Each of the fan blades 60 defines an airfoil 70 which has a leading edge 72 and trailing edge 73 that extends from a blade root 76 to a blade tip 78. The fan blades 60 are integrated with the rotor hub 58 such that the fan blades 60 are integrally formed as a monolithic component with the rotor hub 58 to form an integrally bladed rotor. Each airfoil 70 is formed from an airfoil stub 80 that is machined into the rotor hub 58 and an airfoil section 82 that is linear friction welded (LFW) to the airfoil stub 80 at a linear friction weld 84 in a predetermined area 86.

Figure 3:
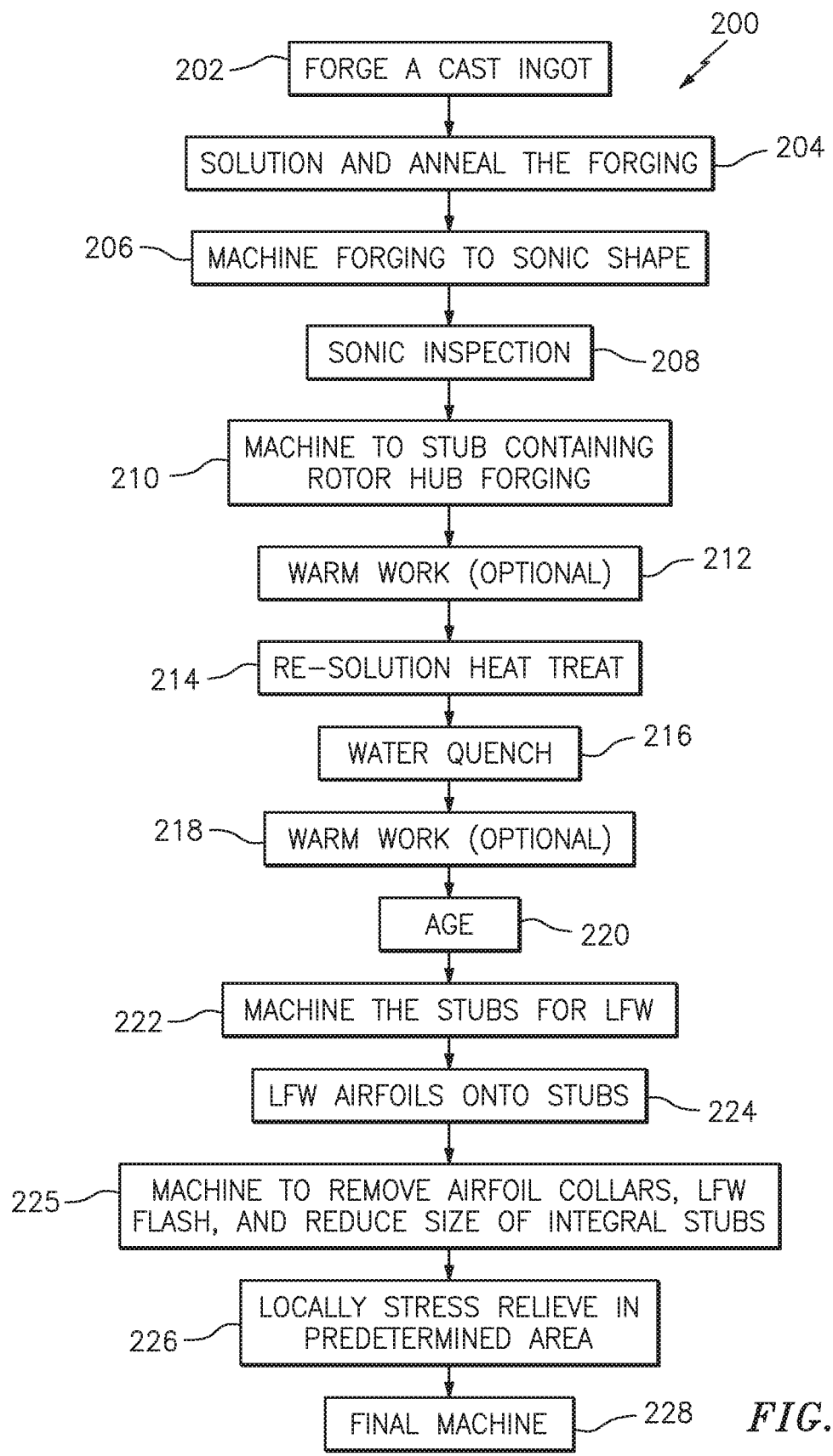
FIG. 3 illustrates a flow diagram of an example method to form a rotor hub.

With reference to FIG. 3, one non-limiting embodiment of a method 200 for producing the integrally bladed rotor 59 is disclosed. Initially, a cast ingot is forged (202). The forged ingot is then solution heat treated and annealed (204). The solution heat temperature varies from heat-to-heat of material due to chemistry variation. Each heat of Ti-6-4 material has a beta transus established by the mill. A solution heat treatment temperature is defined for each part based on the beta transus temperature, which is the lowest temperature at which a 100-percent beta phase can exist. For example, the forged ingot may be heated in argon, vacuum, or air, to a temperature within the range of 50-65 degrees F. (10-18 degrees C.) below beta transus; then held at the selected temperature ±15 degrees F. (±9 degrees C.) for 1 hour; then cooled at a rate equivalent to rapid air cool or faster; then annealed at 1300 degrees F. (704 degrees C.) in argon, vacuum, or air; held at heat for 2 hours; then cooled at a rate equivalent to air cool; and descaled as necessary.

The forged ingot is then machined to a sonic shape (206). A sonic shape is a rectilinear machined shape that is created from the forged ingot. The rectilinear shape facilitates sonic inspection. The sonic shape is then sonic inspected (208).

Next, the sonic shape is machined (210) to fabricate a stub-containing rotor hub forging. The stub-containing rotor hub forging is a nearer-net shape for linear friction welding (LFW) to the stubs 80. Optionally, a warm-working step (212) of the machined stubs 80 is provided for potential mechanical property/grain structure improvement.

The stub-containing rotor hub forging is then re-solution heat treated (214) using the same beta transus temperature that the mill used for its solution heat treatment. In one example, the stub-containing rotor hub forging is re-solution heat treated to a temperature in an upper portion of an acceptable solution temperature range.

Next, the solution heat treated stub-containing rotor hub forging is then water quenched (216). Alternatively, a warm-working step (218) of the machined stubs is next provided for enhanced aging and enhanced mechanical properties within the stub-to-inner flow path region. The water quenched stub-containing rotor hub forging is then aged (220). In one example, the stub-containing rotor hub forging is aged within a furnace at 1000 F for 6 hours.

The aged hub is then further machined to prepare for linear friction welding of the airfoils to the stubs (222).

An airfoil is then linear friction welded onto each of the stubs (224). One example shows the temperature at the linear friction weld 84 to be 2300 degrees F. (1260 degrees C.) and the temperature 0.125 inches (3.175 mm) on either side of the linear friction weld 84 is below 1000 degrees F. (538 degrees C.). Upon completion of all linear friction welding, the IBR is machined to remove the airfoil collars, remove the LFW flash, and reduce the size of the stubs to which the airfoils were linear friction welded (225).

Next, each of the multiple of linear friction welds 84 is concurrently locally stress relieved within the predetermined area 86 (FIG. 2) (226). In one example, the predetermined area 86 is stress relieved at 1100 degrees F. (593 degrees C.)

for 6 hours. Localized stress relief within the predetermined area 86 stress relieves the linear friction weld 84, yet ensures that the stubs 80 near a hub inner diameter 88 (FIG. 2) and the airfoil 70 outwardly span-wise to some design-determined outer diameter will not exceed 1000 degrees F. (538 degrees C.). This protects the improved fatigue and tensile properties previously achieved in (220). In one example, the predetermined area 86 is located at a distance greater than 0.375 inches (9.5 mm), but less than 3 inches (75 mm) from the inner diameter 88. In a more specific example, the predetermined area 86 is greater than 1.5 inches (38 mm) from the inner diameter 88. The total width of the predetermined area 86 in this example is approximately 0.250 inches (8 mm), but varies depending upon the IBR size.

Figure 4:
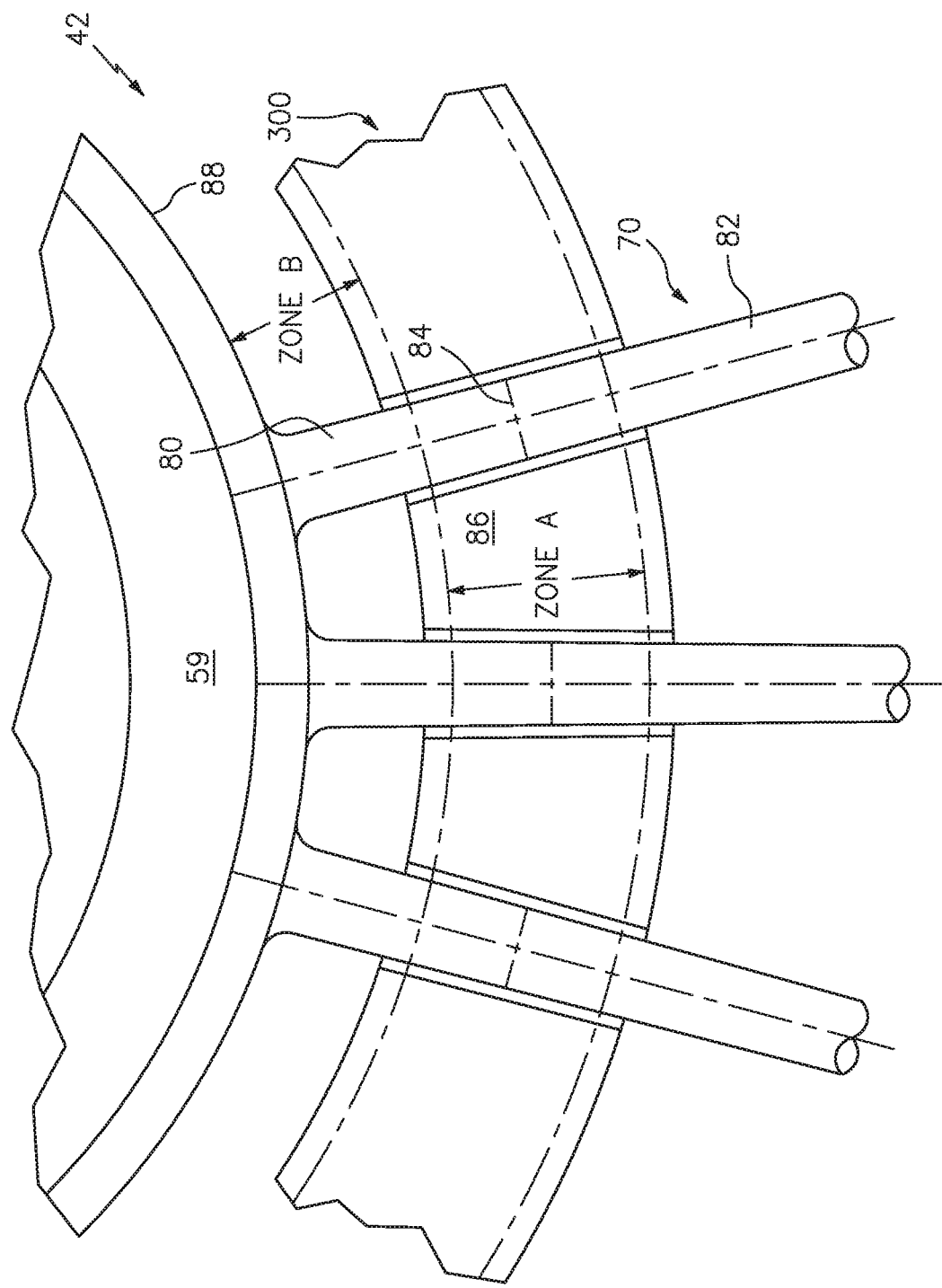
FIG. 4 illustrates a cross-sectional view of one-half of a circumferential tool for stress relieving the linear friction welds of each of the multiple of stubs within a predefined area on the stub-containing rotor hub forging.
Figure 5:
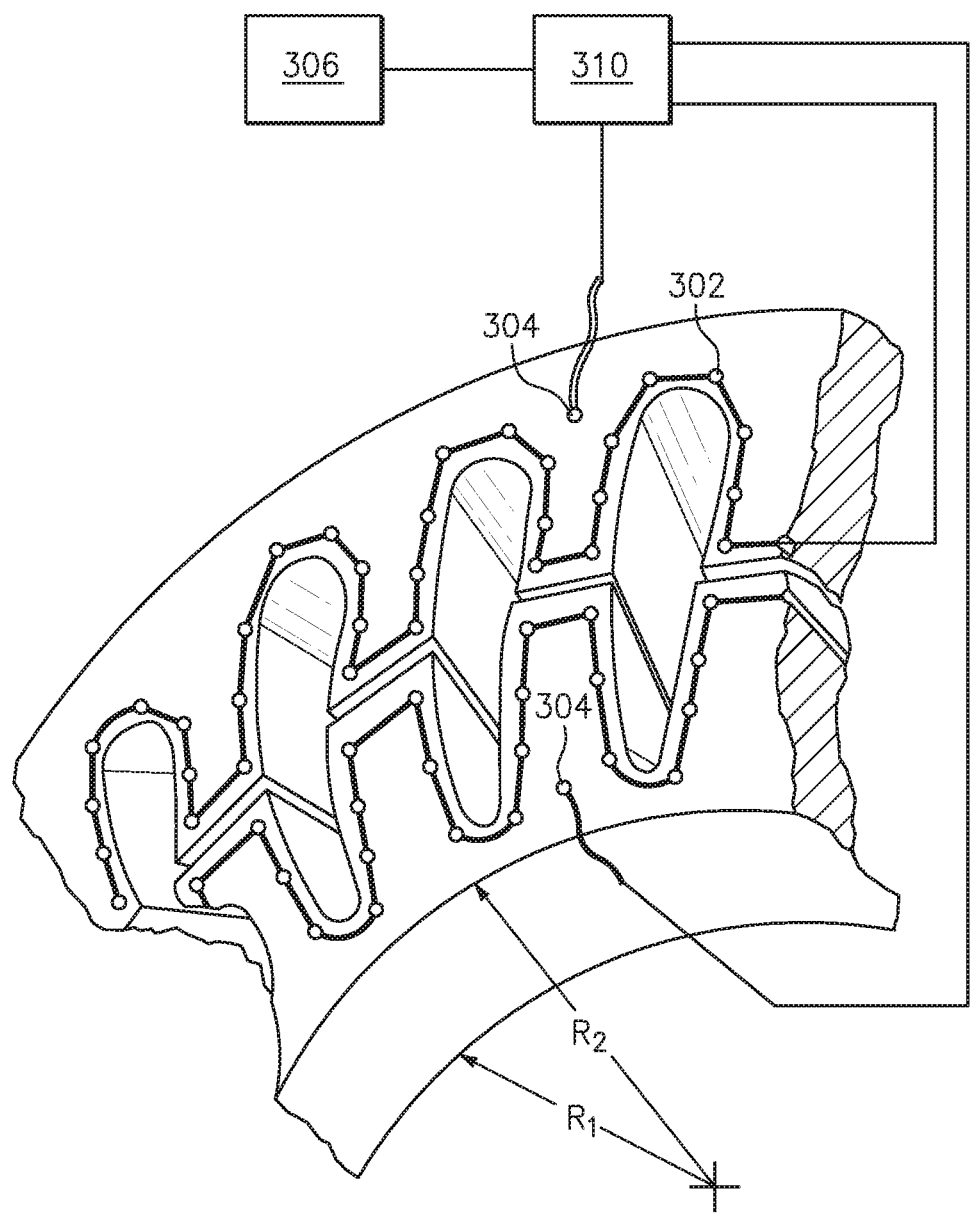
FIG. 5 illustrates a pictorial view of the 2-piece circumferential tool for stress relieving the linear friction welds of each of the multiple of stubs within a predefined area on the stub-containing rotor hub forging.

With reference to FIG. 4, the predetermined area 86 may be stress relieved with a heat treat fixture 300 that mounts around each airfoil 70 at the interface between the respective airfoil stub 80 and airfoil section 82 to span the predetermined area 86. The heat treat fixture 300 may be manufactured of a ceramic material to contain a multiple of heaters 302 (FIG. 5) that produce the desired radiant heat. The heaters 302 may be, for example, calorimetric heating rods or Calrod® tubular heaters manufactured by Wattco Inc. of Lachine, QC Canada. A multiple of thermocouples 304 may also be located in the heat treat fixture 300 to closely control the temperature of the multiple of heaters 302 in the predetermined areas 86 for each airfoil 70 in response to a control system 310 (FIG. 5).

In another embodiment, the airfoil section 82 that is linear friction welded (LFW) to the airfoil stub 80 may be of an equivalent or different material. For example, a hybrid nickel alloy IBR may be a semi-heat treated (or fully heat treated) nickel alloy hub of one material, with airfoils of a different nickel alloy linear friction welded onto the airfoil stubs 80, then subsequently locally stabilization and/or precipitation heat treated within the predetermined area 86, while maintaining a specified maximum temperature near the hub inner diameter 88 and outwardly span-wise to the airfoils' tips 78.

The control system 310 may include at least one processor (e.g., a controller, microprocessor, microcontroller, digital signal processor, etc.), a memory, and an input/output (I/O) subsystem. The control system 310 may be embodied as any type of computing device. The processor and the I/O subsystem are communicatively coupled to the memory. The memory may be embodied as any type of computer memory device (e.g., volatile memory such as various forms of random access memory). The I/O subsystem may be communicatively coupled to a number of hardware, firmware, and/or software components, including a data storage device, a display, a communication subsystem, a user interface (UI) subsystem, the multiple of heaters 302, the multiple of thermocouples 304, and a power source 306.

The integrally bladed rotor 59 is then finish machined to a final configuration (228).

The method 200 for producing the integrally bladed rotor 59 potentially increases high cycle fatigue (HCF) strength by as much as 30% at 250 degrees F. (482 degrees C.), plus increases 0.2% yield and tensile strengths by as much as 15% at 250 degrees F. (482 degrees C.) compared to conventional processes. The increased HCF and tensile strengths can be leveraged to increase life for an existing weight. Alternatively, if life is held constant, the improved mechanical properties enables reduced part weight.

Figure 6:
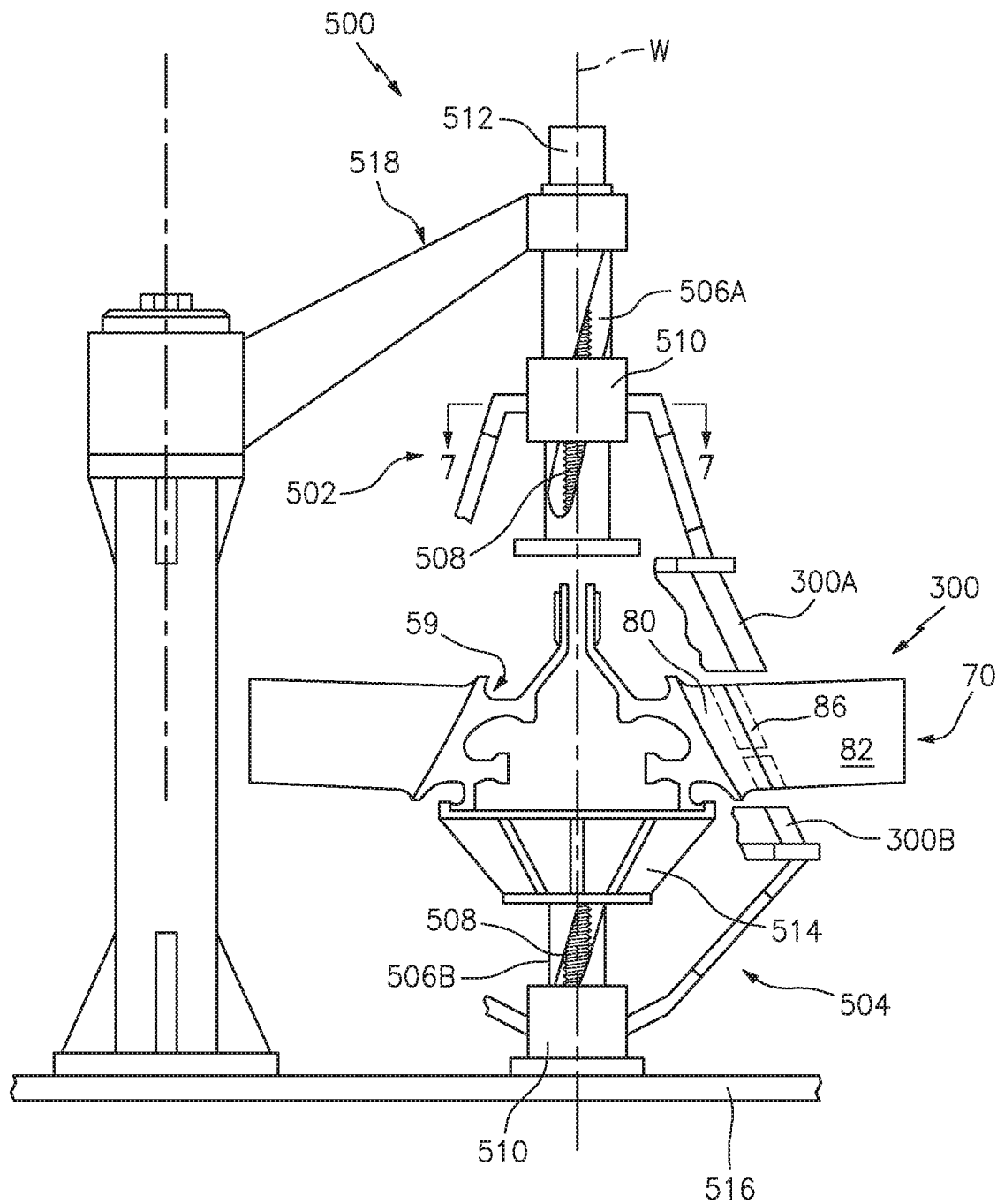
FIG. 6 illustrates a tool with an upper heat treat fixture portion and a lower heat treat fixture.

With reference to FIG. 6, a tool 500 supports an upper heat treat fixture portion 300A and a lower heat treat fixture portion 300B of the heat treat fixture 300 along an axis W. Each of the upper heat treat fixture portion 300A and the lower heat treat fixture portion 300B include airfoil shaped openings which mount around each airfoil 70 at the interface between the respective airfoil stub 80 and airfoil section 82 to span the predetermined area 86.

The tool 500 includes an upper support structure 502 and a lower support structure 504 that translate and rotate the upper heat treat fixture portion 300A and the lower heat treat fixture portion 300B along a respective columnar track 506A, 506B. The integrally bladed rotor includes airfoils 70 at a predetermined fixed pitch such that the upper heat treat fixture portion 300A and the lower heat treat fixture portion 300B must respectively translate and rotate along axis W to fit around and then enclose the predetermined area 86 of each airfoil 70.

The upper heat treat fixture portion 300A and the lower heat treat fixture portion 300B are simultaneously positioned by a lead screw 508 driven by a geared motor 512. The respective columnar track 506A, 506B, and the lead screw 508, extend along the axis W.

The lower heat treat fixture portion 300B is located on the columnar track 506B adjacent to a fixed support plate 514 with respect to a base 516. The fixed support plate 514 positions the integrally bladed rotor 59 and may house the geared motor 512. The upper heat treat fixture portion 300A is located on the columnar track 506A and the columnar track 506A is positioned by a structure 518 that is mounted to the base 516. The structure 518 may rotate about an axis to facilitate loading and unloading of the integrally bladed rotor 59.

The upper heat treat fixture portion 300A and the lower heat treat fixture portion 300B each include a collar assembly 510 that provides the coordinated rotational and translational movement of the upper heat treat fixture portion 300A and the lower heat treat fixture portion 300B along the respective columnar track 506A, 506B. Although only a single collar assembly 510 will be described in detail, each is essentially the same.

Figure 7:
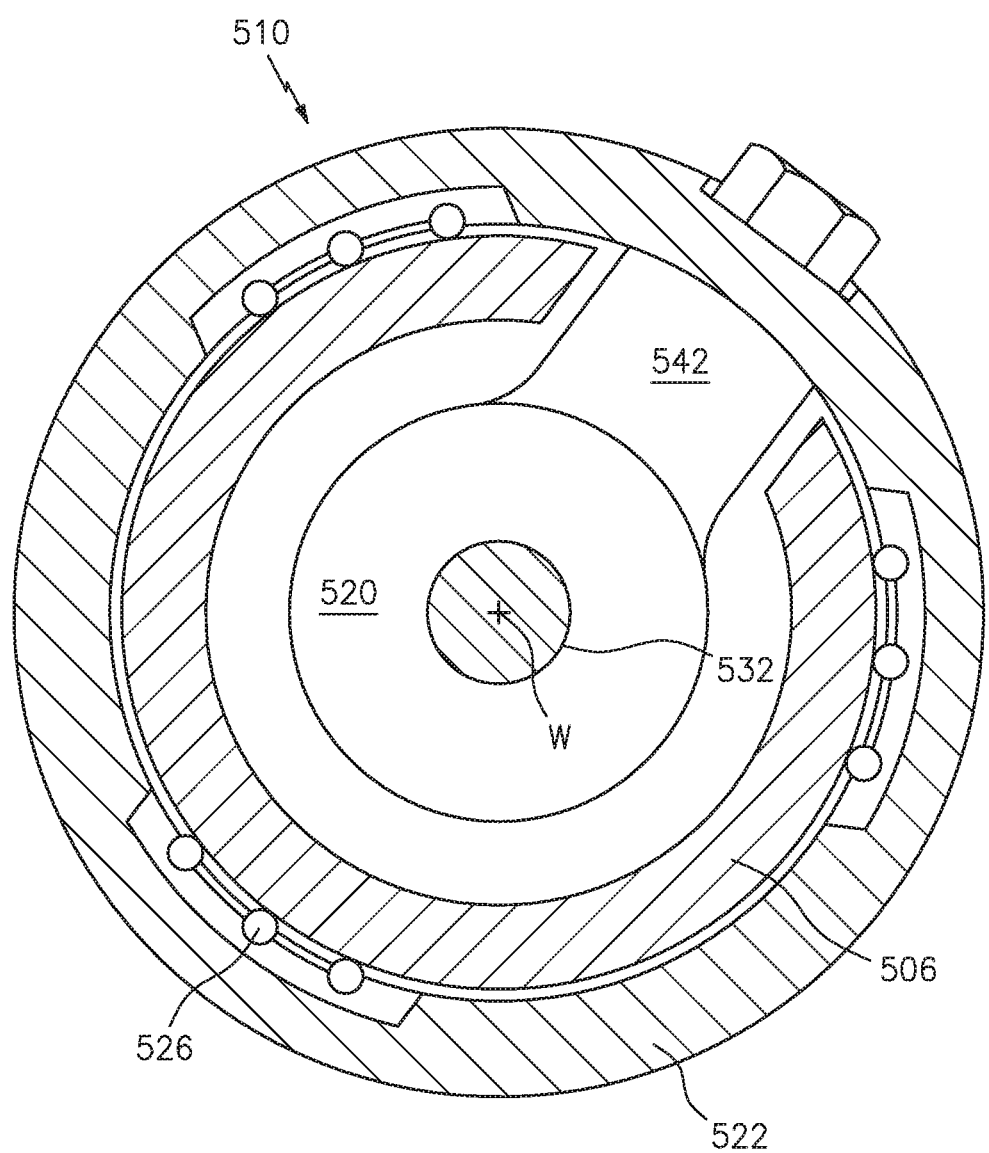
FIG. 7 illustrates a sectional view of a collar assembly of the tool of FIG. 6.

With respect to FIG. 7, the collar assembly 510 includes a connecting arm 520 and a carrier 522. The connecting arm 520 and the carrier 522 are supported along the columnar track 506 by the lead screw 508.

Figure 8:
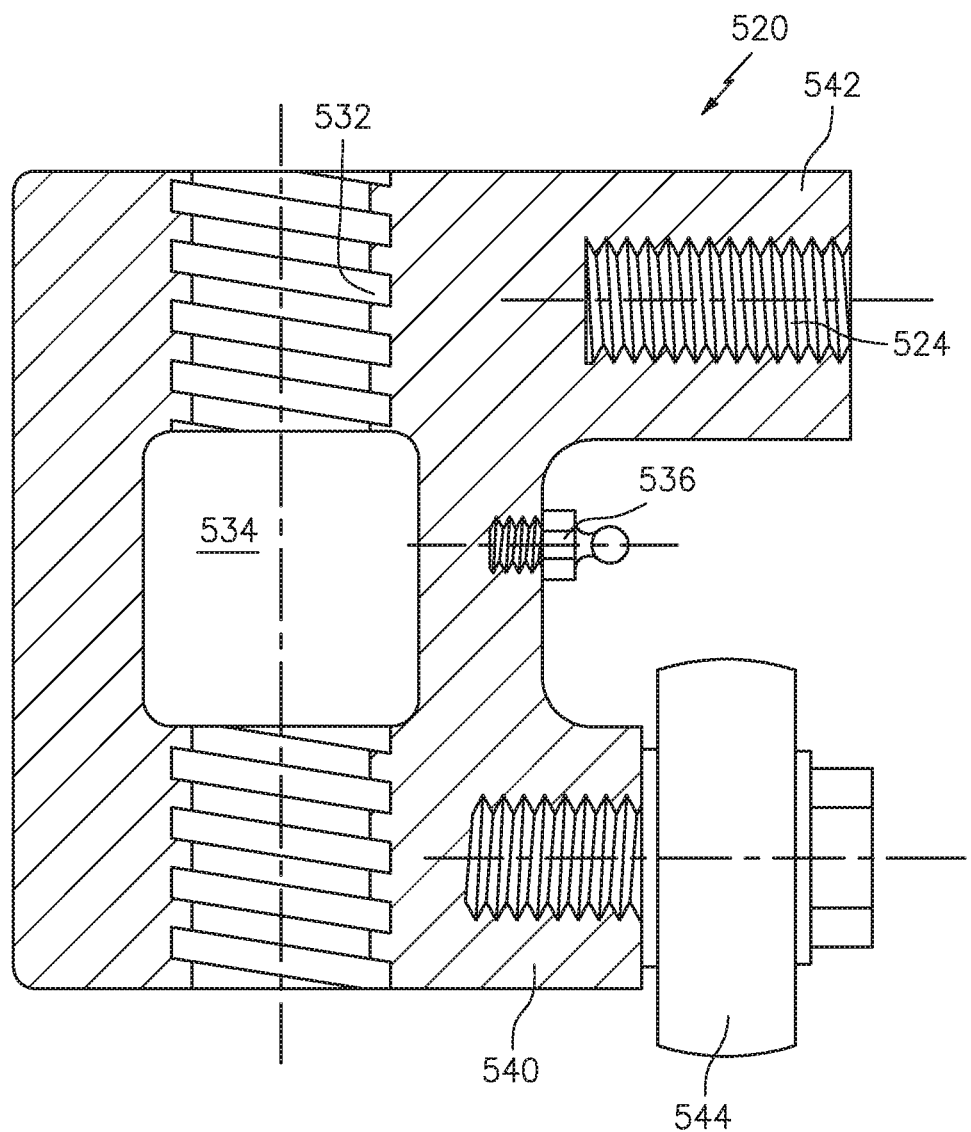
FIG. 8 illustrates a sectional view of the connecting arm of the collar assembly.
Figure 9:
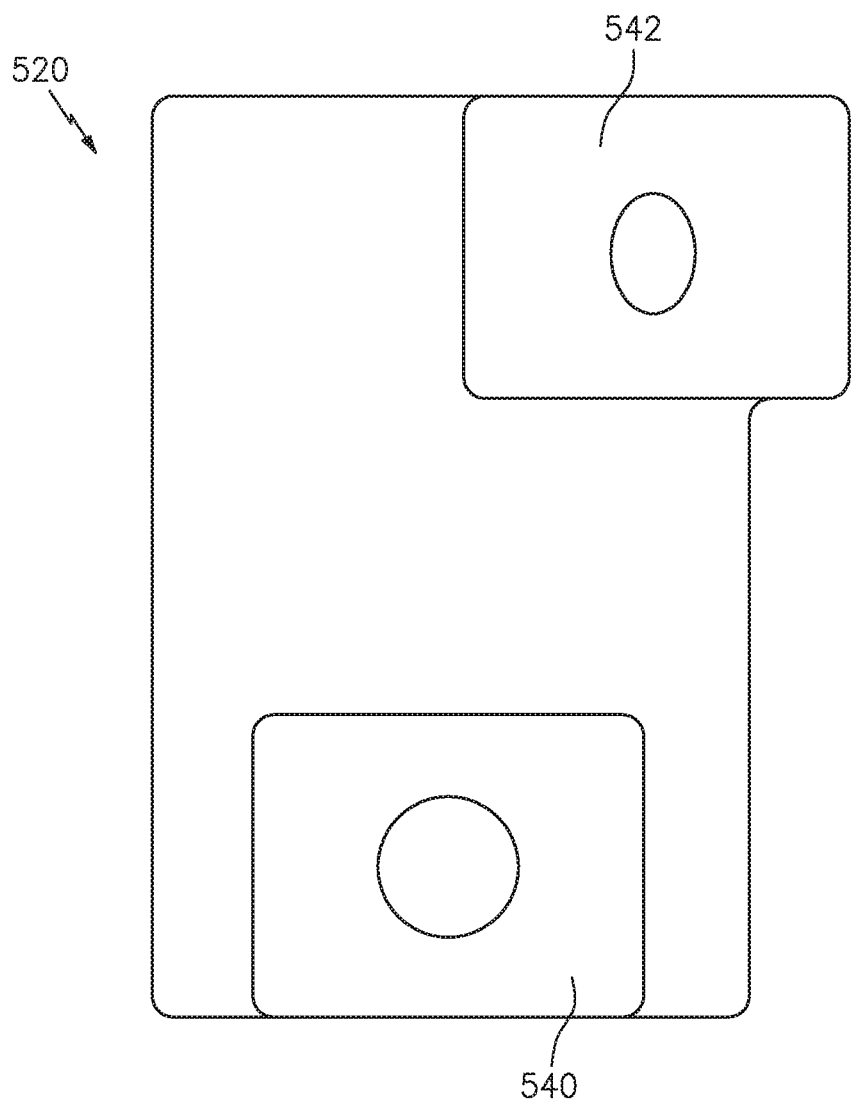
FIG. 9 illustrates a schematic perspective view of the connecting arm of the collar assembly.
Figure 10:
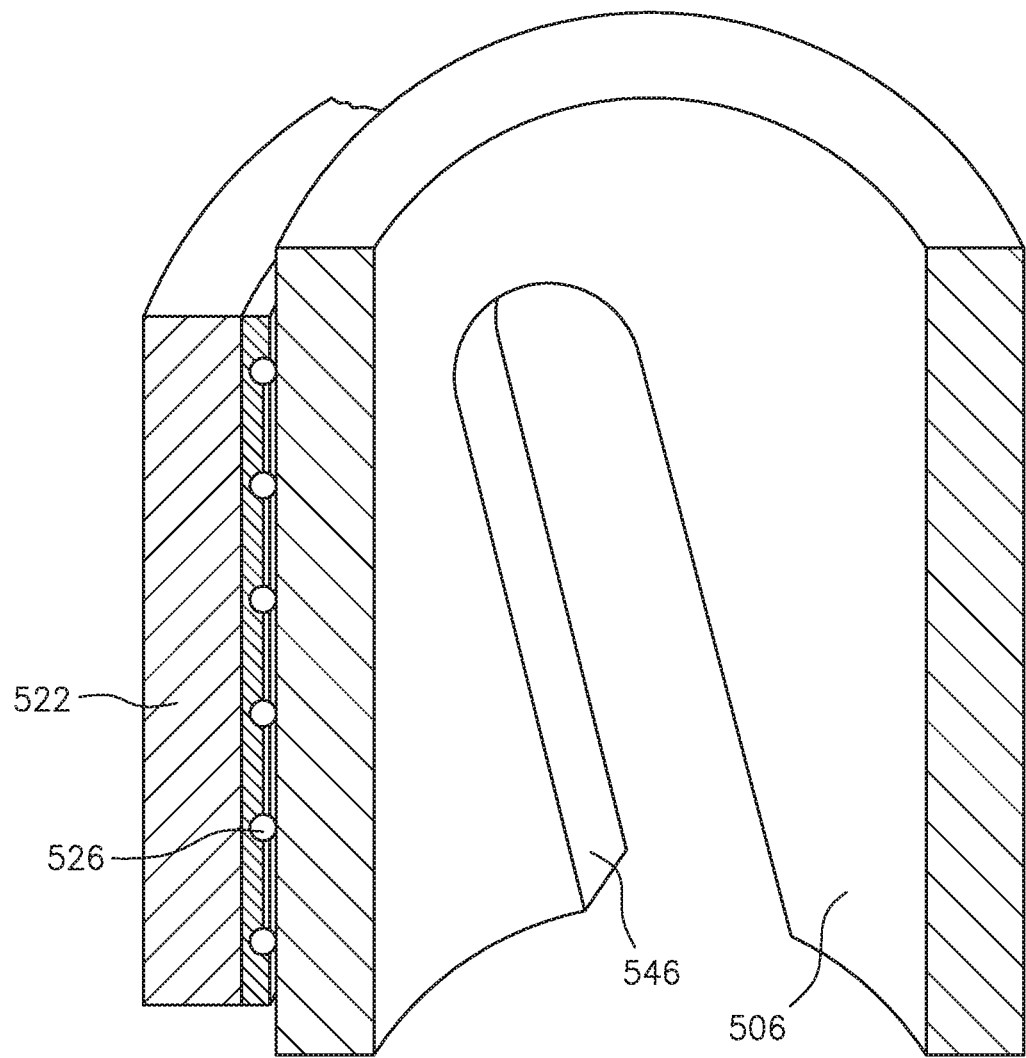
FIG. 10 illustrates a sectional view of the columnar track and carrier of the collar assembly.
Figure 11:
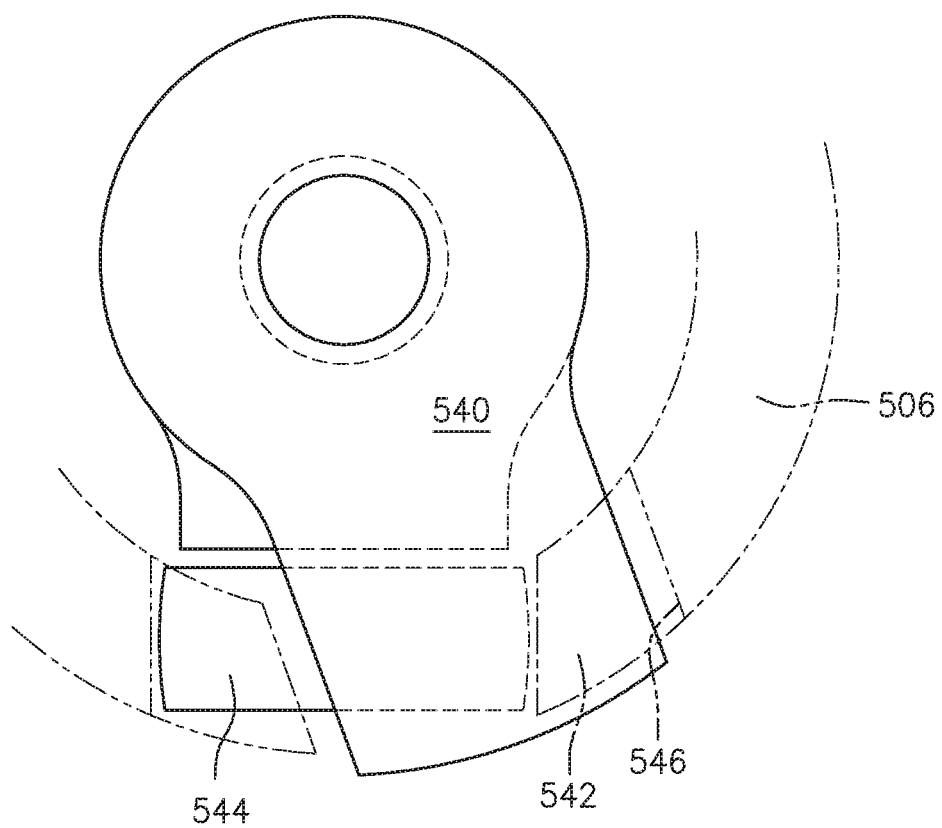
FIG. 11 illustrates a top view of the connecting arm of the collar assembly of the tool of FIG. 6.

With respect to FIG. 8, the connecting arm 520 includes an internal thread 532 that receives the lead screw 508 to provide the motive power for the upper heat treat fixture portion 300A and the lower heat treat fixture portion 300B. The internal thread 532 may include a cavity 534 that receives a lubricant from a grease fitting 536. The connecting arm 520 includes a first arm 540 and a second arm 542 that are rotationally offset by, for example, about 20 degrees (FIG. 9). The first arm 540 supports a crowned roller 544 that engages a through-wall helical slot 546 in the columnar track 506 (FIG. 10). The second arm 542 mounts to the carrier 522 (FIG. 7) via a fastener that is received within, for example, a threaded blind hole 524. The second arm 542 extends through the helical slot 546 in the columnar track 506 (FIG. 7).

The carrier 522 rides along an outer surface of the columnar track 506. Bearings 526 (FIGS. 7 and 10), such as linear ball bearing, are located within the carrier 522 to ride along the columnar track 506 to support the connecting arm 520 in response to rotation of the lead screw 508.

Figure 12:
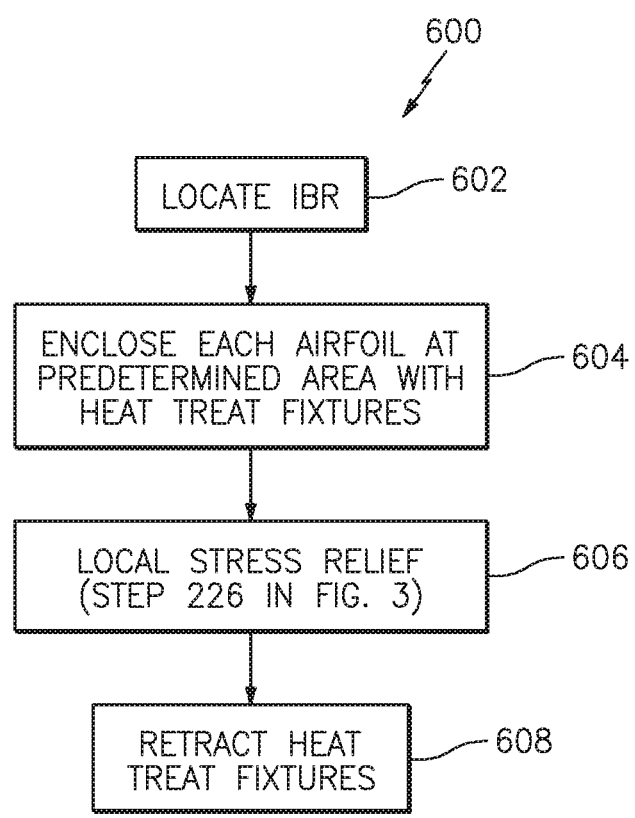
FIG. 12 illustrates a flow diagram of an example method to operate the tool of FIG. 6.

With reference to FIG. 12, one non-limiting embodiment of a method 600 for positioning the heat treat fixture 300 on the integrally bladed rotor 59 is disclosed. Initially, the integrally bladed rotor 59 is retained upon the fixed support plate 514 (602). Next, the geared motor 512 rotates the lead screw 508 in response to the control system 310 to translate and rotate the upper heat treat fixture portion 300A and the lower heat treat fixture portion 300B along axis W to enclose each airfoil 70 at the interface between the respective airfoil stub 80 and airfoil section 82 (604). That is, the upper heat treat fixture portion 300A and the lower heat treat fixture portion 300B translate and rotate along axis W to follow the pitch of each airfoil 70. The adjacent upper heat treat fixture portion 300A and the lower heat treat fixture portion 300B when closed span the predetermined area 86.

Next, each of the multiple of linear friction welds 84 are then concurrently locally stress relieved (606) within the predetermined area 86 with the heat treat fixture 300 as detailed above in step 226. After being locally stress relieved, the geared motor 512 rotates the lead screw 508 in response to the control system 310 to translate and rotate the upper heat treat fixture portion 300A and the lower heat treat fixture portion 300B along axis W to retract the upper heat treat fixture portion 300A and the lower heat treat fixture portion 300B from around each airfoil 70 so that the integrally bladed rotor 59 can be removed (608).

The tool 500 readily facilitates proper positioning and simultaneous local stress relief of each of the multiple of linear friction welds 84 on the integrally bladed rotor hub 58.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward", "aft", "upper", "lower", "above", "below", and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiments, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A tool for simultaneous local stress relief of each of a multiple of linear friction welds of an article, the tool comprising:
   a columnar track defined along an axis, the columnar track having a through-wall helical slot;
   a heat treat fixture portion comprising a multiple of heaters operable to produce radiant heat to each of the multiple of linear friction welds; and
   a support structure to translate and rotate the heat treat fixture portion along the axis, the support structure comprises a collar assembly with a carrier that rides along an outer surface of the columnar track and a connecting arm that extends from the carrier through the through-wall helical slot.

2. The tool as recited in claim 1, wherein the connecting arm supports a crowned roller that engages the helical slot.

3. The tool as recited in claim 1, wherein the carrier supports a bearing that rides along the outer surface of the columnar track.

4. The tool as recited in claim 1, wherein the connecting arm includes an internal thread that receives a lead screw to provide the motive power for the support structure.

5. A tool for simultaneous local stress relief of each of a multiple of linear friction welds of an integrally bladed rotor, the tool comprising:
   a columnar track defined along an axis, the columnar track having a through-wall helical slot;
   an upper support structure to translate and rotate an upper heat treat fixture portion along the axis, the upper heat treat fixture portion comprising a multiple of heaters operable to produce radiant heat to each of the multiple of linear friction welds, the upper support structure comprises an upper collar assembly with an upper carrier that rides along an outer surface of the columnar track and an upper connecting arm that extends from the carrier through the through-wall helical slot; and
   a lower support structure to translate and rotate a lower heat treat fixture portion along the axis, the lower heat treat fixture portion comprising a multiple of heaters operable to produce radiant heat to each of the multiple of linear friction welds, the lower support structure comprises a lower collar assembly with a lower carrier that rides along an outer surface of the columnar track and a lower connecting arm that extends from the lower carrier through the through-wall helical slot, the lower support structure translates and rotates opposite the upper support structure such that the upper heat treat fixture portion moves toward the lower heat treat fixture portion to fit around and enclose a predetermined area of each of the multiple of linear friction welds of the integrally bladed rotor.

6. The tool as recited in claim 5, wherein each of the multiple of linear friction welds are on a stub-containing rotor hub forging.

7. The tool as recited in claim 5, wherein each of the multiple of linear friction welds are between a stub and an airfoil.

8. The tool as recited in claim 7, wherein each stub and airfoil are pitched at a fixed angle.

9. The tool as recited in claim 5, wherein the upper heat treat fixture portion and the lower heat treat fixture portion each contain a multiple of heaters that produce a desired radiant heat around each of a multiple of airfoil shaped openings that define a predetermined area adjacent to each of the multiple of linear friction welds.

10. The tool as recited in claim 9, wherein the multiple of heaters are controlled by a control system in response to a temperature measurement by at least one thermocouple associated with each of the multiple of linear friction welds.

11. The tool as recited in claim 10, wherein the desired radiant heat around each of the multiple of airfoil shaped openings is individually controlled.

12. The tool as recited in claim 5, wherein the upper heat treat fixture portion and the lower heat treat fixture portion are manufactured of ceramic to support a multiple of heaters and a multiple of thermocouples.

13. The tool as recited in claim 1, wherein the article is an integrally bladed rotor that comprises airfoils at a predetermined fixed pitch.

\* \* \* \* \*